US012225219B2

United States Patent
Naito et al.

(10) Patent No.: US 12,225,219 B2
(45) Date of Patent: Feb. 11, 2025

(54) ENHANCED VIDEO DECODER USING TILE-TO-RASTER REORDERING

(71) Applicant: QUALCOMM Incorporated, San Diego, CA (US)

(72) Inventors: Tomoyuki Naito, San Diego, CA (US); Yasutomo Matsuba, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 124 days.

(21) Appl. No.: 18/066,986

(22) Filed: Dec. 15, 2022

(65) Prior Publication Data

US 2024/0205434 A1     Jun. 20, 2024

(51) Int. Cl.
*H04N 19/42* (2014.01)
*H04N 19/172* (2014.01)
*H04N 19/174* (2014.01)
*H04N 19/184* (2014.01)
*H04N 19/70* (2014.01)

(52) U.S. Cl.
CPC ........... *H04N 19/42* (2014.11); *H04N 19/172* (2014.11); *H04N 19/174* (2014.11); *H04N 19/184* (2014.11); *H04N 19/70* (2014.11)

(58) Field of Classification Search
None
See application file for complete search history.

(56) References Cited

U.S. PATENT DOCUMENTS

| 2013/0279817 A1* | 10/2013 | Wan ...................... H04N 19/44 382/233 |
| 2015/0003513 A1 | 1/2015 | Hashimoto et al. |
| 2018/0278948 A1* | 9/2018 | Matsuba .............. H04N 19/436 |

OTHER PUBLICATIONS

International Search Report and Written Opinion—PCT/US2023/080807—ISA/EPO—Mar. 4, 2024.

* cited by examiner

*Primary Examiner* — Xiaolan Xu
(74) *Attorney, Agent, or Firm* — QUALCOMM Incorporated; Espartaco Diaz Hidalgo

(57) ABSTRACT

Systems and techniques are described herein for processing video data. For instance, a process can include obtaining first encoded data for a first portion of an image, the image encoded in a plurality of independently decodable portions. The process can further include generating first intermediate data for the first portion of the image, storing the first intermediate data in a bitstream order, obtaining second encoded data for a second portion of the image, generating second intermediate data for the second portion of the image, storing the second intermediate data in the bitstream order, wherein the first intermediate data is stored separate from the second intermediate data, processing the first intermediate data and the second intermediate data in a raster scan order across the first portion of the image and the second portion of the image to generate a part of the image.

23 Claims, 7 Drawing Sheets

ENHANCED VIDEO DECODER USING TILE-TO-RASTER REORDERING

TECHNICAL FIELD

This application is generally related to video processing. For example, aspects of the application relate to improving video coding techniques (e.g., encoding and/or decoding video) with respect to an enhanced video decoder using tile-to-raster reordering.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Such devices allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Digital video devices can implement video coding techniques to compress video data. Video coding is performed according to one or more video coding standards or formats. For example, video coding standards or formats include versatile video coding (VVC), high-efficiency video coding (HEVC), advanced video coding (AVC), MPEG-2 Part 2 coding (MPEG stands for moving picture experts group), Essential Video Coding (EVC), among others, as well as proprietary video coder-decoder (codecs)/formats such as AOMedia Video 1 (AV1) that was developed by the Alliance for Open Media. Video coding generally utilizes prediction methods (e.g., inter prediction, intra prediction, or the like) that take advantage of redundancy present in video images or sequences. A goal of video coding techniques is to compress video data into a form that uses a lower bit rate, while avoiding or minimizing degradations to video quality. With ever-evolving video services becoming available, coding and decoding techniques that can improve efficiency or reduce hardware costs are needed.

SUMMARY

Systems and techniques are described herein for processing video data. According to at least one example, an apparatus for processing video data. The apparatus including at least one memory and at least one processor (e.g., configured in circuitry) coupled to the at least one memory. The at least one processor is configured to: obtain first encoded data for a first portion of an image, wherein the image is encoded in a plurality of independently decodable portions; generate first intermediate data for the first portion of the image; store the first intermediate data in the at least one memory in a bitstream order; obtain second encoded data for a second portion of the image; generate second intermediate data for the second portion of the image; and store the second intermediate data in the at least one memory in the bitstream order, wherein the first intermediate data is stored separate from the second intermediate data; and a plurality of processing pipelines coupled to the at least one processor and the at least one memory, the plurality of processing pipelines configured to process the first intermediate data and the second intermediate data in a raster scan order across the first portion of the image and the second portion of the image to generate a part of the image.

In another example, a method for processing video data is provided. The method includes: obtaining first encoded data for a first portion of an image, wherein the image is encoded in a plurality of independently decodable portions; generating first intermediate data for the first portion of the image; storing the first intermediate data in at least one memory in a bitstream order; obtaining second encoded data for a second portion of the image; generating second intermediate data for the second portion of the image; storing the second intermediate data in the at least one memory in the bitstream order, wherein the first intermediate data is stored separate from the second intermediate data; and processing the first intermediate data and the second intermediate data in a raster scan order across the first portion of the image and the second portion of the image to generate a part of the image.

As another example, a non-transitory computer-readable medium having stored thereon instructions is provided. The instructions, when executed by at least one processor, cause the at least one processor to: obtain first encoded data for a first portion of an image, wherein the image is encoded in a plurality of independently decodable portions; generate first intermediate data for the first portion of the image; store the first intermediate data in at least one memory in a bitstream order; obtain second encoded data for a second portion of the image; generate second intermediate data for the second portion of the image; and store the second intermediate data in the at least one memory in the bitstream order, wherein the first intermediate data is stored separate from the second intermediate data; and wherein the instructions, when executed by a plurality of processing pipelines, further cause the plurality of processing pipelines to process the first intermediate data and the second intermediate data in a raster scan order across the first portion of the image and the second portion of the image to generate a part of the image.

In another example, an apparatus for processing video data is provided. The apparatus includes: means for obtaining first encoded data for a first portion of an image, wherein the image is encoded in a plurality of independently decodable portions; means for generating first intermediate data for the first portion of the image; means for storing the first intermediate data in at least one memory in a bitstream order; means for obtaining second encoded data for a second portion of the image; means for generating second intermediate data for the second portion of the image; means for storing the second intermediate data in the at least one memory in the bitstream order, wherein the first intermediate data is stored separate from the second intermediate data; and means for processing the first intermediate data and the second intermediate data in a raster scan order across the first portion of the image and the second portion of the image to generate a part of the image.

In some aspects, any of the apparatuses or devices described above is, is part of, and/or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a camera, a personal computer, a laptop computer, a server computer, a vehicle or a computing device or component of a vehicle, a robotics device or system, a television, or other device. In some aspects, the apparatuses or devices include a camera or multiple cameras for capturing one or more pictures, images, or frames. In some aspects, the apparatuses or devices include a display for displaying one or more images, notifications, and/or other displayable data. In some aspects, the apparatuses or devices can include one or more sensors (e.g., one or more inertial measurement units (IMUs), such as one or more gyroscopes, one or more accelerometers, any combination thereof, and/or other sensor.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
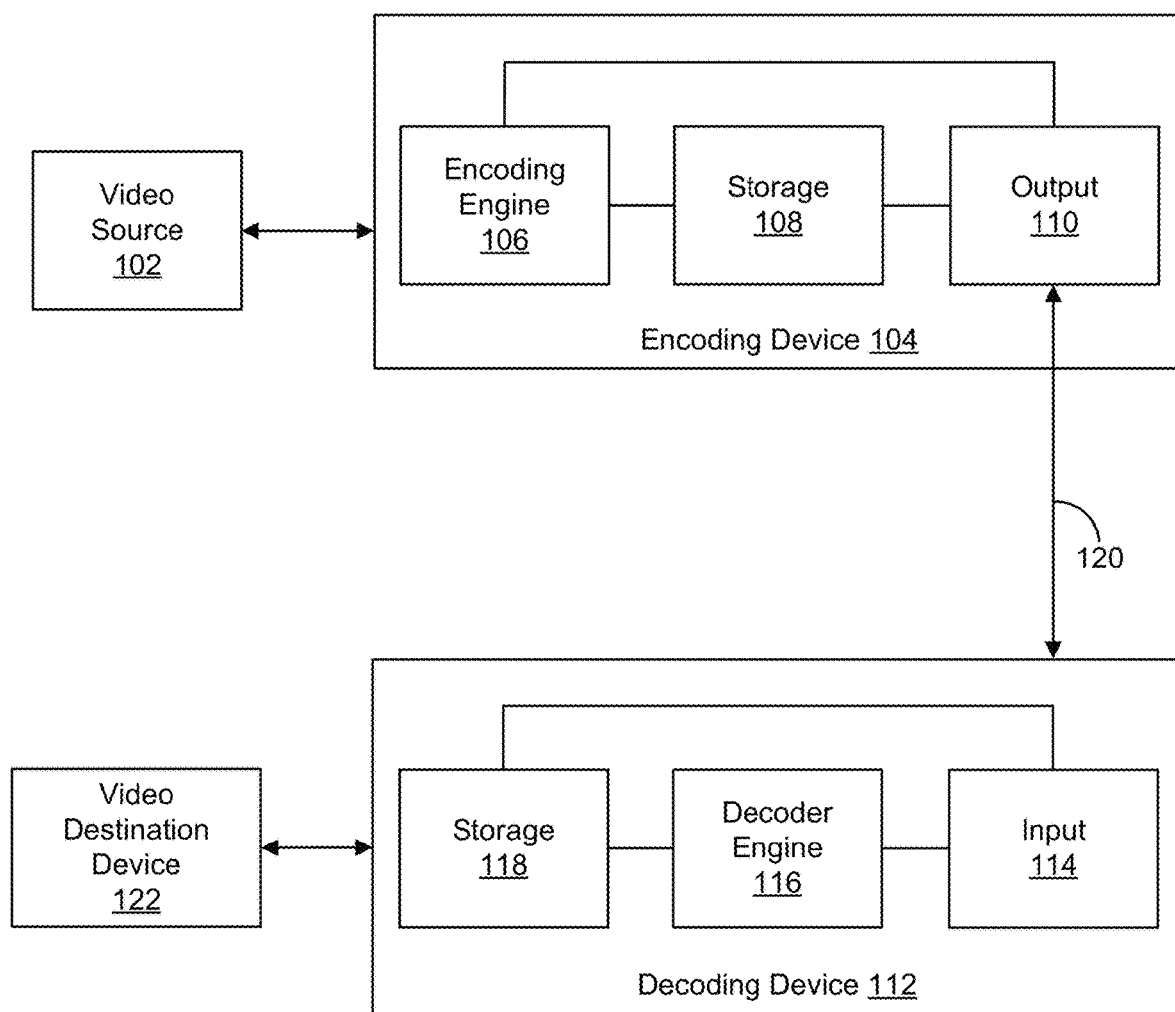
FIG. 1 is a block diagram illustrating an example of an encoding device and a decoding device, in accordance with some aspects of the disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data), and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

In some cases, an image may be encoded using independently decodable portions, such as tiles. As these tiles are independently decodable, coded data for a tile contains sufficient data to all the tile of the image to be decoded without reference to other tiles. Blocks of a tile may be coded in a raster scan order for the blocks of the tile and stored. Thus, a bitstream of the encoded data may describe all of the blocks of the tile in a raster scan order before describing blocks of another tile.

In some cases, such a bitstream may be decoded, in part, by a plurality of processing pipelines configured to operate in parallel. In some cases, a processing pipeline may refer to a plurality of processing elements for performing an operation where the processing elements are serially coupled so that data being processed by the processing pipeline is passed from one processing element to the next. As an example, a single processing pipeline may be made up of a plurality of processing elements for decoding a block of encoded video. However, as many codecs include blocks which depend on decoded information in other blocks, within a tile, the processing pipelines may be configured to decode one or more rows of blocks of a tile in a wave-like manner. For example, a first processing pipeline may process blocks of a first row, while a second processing pipeline may process blocks of a second row immediately below the first row. The first processing pipeline may process a block in a column of the first row that is y number of columns ahead of a block in the second row that the second processing pipeline is processing. Thus, when beginning to process a tile, after the first processing pipeline begins to process the first row, there is a delay before the second processing pipeline can start processing the second row. Similarly, there may be additional delays for other processing pipelines of the plurality of processing pipelines. This initial delay may be incurred for each tile in an image. In some cases, it may be useful to reduce the initial delay.

Systems, apparatuses, electronic devices, methods (also referred to as processes), and computer-readable media (collectively referred to herein as "systems and techniques") are described herein for an enhanced decoder which may reorder decoding, by a plurality of processing pipelines from a bitstream order (e.g., tile order) to a raster order across the independently decodable portions (e.g., tiles). In some cases, an encoded bitstream may be preprocessed to generate and store intermediate data in a tile order. For example, a part of the bitstream encoding the first tile of the image may be processed before processing a part the bitstream encoding the second tile of the image. Control data may be generated and stored along with the intermediate data. The control information may indicate a raster scan order for processing the intermediate data across the first tile and the second tile. In some cases, the processing pipelines may process the intermediate data in a raster scan order for the entire frame across the tiles. In some cases, the processing pipelines may process the intermediate data in a raster scan order based on the stored control data.

The systems and techniques described herein can provide various advantages. For example, by reordering the processing order from bitstream order to raster order across portions of a frame, the initial delay may be reduced from once per portion of the frame (e.g., tile) to once per frame. Additionally, reordering the processing order may help maintain consistent performance independent of tile sizes/numbers. In some cases, load balancing across the processing pipelines may be enhanced in cases where processing of a starting row of a portion is always performed by certain processing pipelines as the processing of the starting row is per frame rather than per portion.

The systems and techniques described herein can be applied to any of the existing video codecs, such as Versatile Video Coding (VVC), High Efficiency Video Coding (HEVC), Advanced Video Coding (AVC), Essential Video Coding (EVC), VP9, the AV1 format/codec, and/or other video coding standard, codec, format, etc. in development or to be developed.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. As used herein, the term coding can refer to encoding and/or decoding. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard, format, codec, or protocol to generate an encoded video bitstream. Examples of video coding standards and formats/codecs include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, and Versatile Video Coding (VVC) or ITU-T H.266. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). VP9, AOMedia Video 1 (AV1) developed by the Alliance for Open Media Alliance of Open Media (AOMedia), and Essential Video Coding (EVC) are other video coding standards for which the techniques described herein can be applied.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, VVC and/or other video coding standard in development or to be developed. For example, examples described herein can be performed using video codecs such as VVC, HEVC, AVC, and/or extensions thereof. However, the techniques and systems described herein may also be applicable to other coding standards, codecs, or formats, such as MPEG, JPEG (or other coding standard for still images), EVC, VP9, AV1, extensions thereof, or other suitable coding standards already available or not yet available or developed. For instance, in some examples, the encoding device 104 and/or the decoding device 112 may operate according to a proprietary video codec/format, such as AV1, extensions of AV1, and/or successor versions of AV1 (e.g., AV2), or other proprietary formats or industry standards. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. VCL NAL units include coded picture data forming a coded video bitstream. For example, a sequence of bits forming the coded video bitstream is present in VCL NAL units. A VCL NAL unit can include one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). In some cases, each slice or other portion of a bitstream can reference a single active PPS, SPS, and/or VPS to allow the decoding device 112 to access information that may be used for decoding the slice or other portion of the bitstream.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments.

In HEVC, the slices are then partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some implementations, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and decoder engine 116 (described in more detail below) may be configured to operate according to VVC. According to VVC, a video coder (such as encoder engine 106 and/or decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

When operating according to the AV1 codec, video encoder engine 106 and video decoder engine 116 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder engine 106 may further partition a superblock into smaller coding blocks. Video encoder engine 106 may partition a superblock and other coding blocks into smaller blocks using square or non-square partitioning. Non-square blocks may include N/2×N, N×N/2, N/4×N, and N×N/4 blocks. Video encoder engine 106 and video decoder engine 116 may perform separate prediction and transform processes on each of the coding blocks.

AV1 also defines a tile of video data. A tile is a rectangular array of superblocks that may be coded independently of other tiles. That is, video encoder engine 106 and video decoder engine 116 may encode and decode, respectively, coding blocks within a tile without using video data from other tiles. However, video encoder engine 106 and video decoder engine 116 may perform filtering across tile boundaries. Tiles may be uniform or non-uniform in size. Tile-based coding may enables parallel processing and/or multi-threading for encoder and decoder implementations.

In some examples, the video coder can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The video coder can be configured to use quadtree partitioning, QTBT partitioning, MTT partitioning, superblock partitioning, or other partitioning structure.

In some examples, the one or more slices of a picture are assigned a slice type. Slice types include an intra-coded slice (I-slice), an inter-coded P-slice, and an inter-coded B-slice. An I-slice (intra-coded frames, independently decodable) is a slice of a picture that is only coded by intra-prediction, and therefore is independently decodable since the I-slice requires only the data within the frame to predict any prediction unit or prediction block of the slice. A P-slice (uni-directional predicted frames) is a slice of a picture that may be coded with intra-prediction and with uni-directional inter-prediction. Each prediction unit or prediction block within a P-slice is either coded with intra-prediction or inter-prediction. When the inter-prediction applies, the prediction unit or prediction block is only predicted by one reference picture, and therefore reference samples are only from one reference region of one frame. A B-slice (bi-directional predictive frames) is a slice of a picture that may be coded with intra-prediction and with inter-prediction (e.g., either bi-prediction or uni-prediction). A prediction unit or prediction block of a B-slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction of a picture utilizes the correlation between spatially neighboring samples within the picture. There is a plurality of intra-prediction modes (also referred to as "intra modes"). In some examples, the intra prediction of a luma block includes 35 modes, including the Planar mode, DC mode, and 33 angular modes (e.g., diagonal intra prediction modes and angular modes adjacent to the diagonal intra prediction modes). The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra prediction mode and associated names

| Intra-prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a current block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction (also referred to as bi-directional inter-prediction), two sets of motion parameters ($\Delta x_0$, $y_0$, $refIdx_0$, and $\Delta x_1$, $y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are then combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoder using a motion estimation process.

With inter-prediction using uni-prediction (also referred to as uni-directional inter-prediction), one set of motion parameters ($\Delta x_0$, $y_0$, $refIdx_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder engine 106 and video decoder engine 116 do not use video data from other frames of video data. For most intra prediction modes, the video encoding device 104 encodes blocks of a current frame based on the difference between sample values in the current block and predicted values generated from reference samples in the same frame. The video encoding device 104 determines predicted values generated from the reference samples based on the intra prediction mode.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), ultra-wideband (UWB), WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitting the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a current block of pixels (e.g., a PU). In some examples, the prediction is merged to the output of the inverse transform (the residual data).

The video decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

This disclosure may generally refer to "signaling" certain information, such as syntax elements. The term "signaling" may generally refer to the communication of values for syntax elements and/or other data used to decode encoded video data. For example, the video encoding device 104 may signal values for syntax elements in the bitstream. In general, signaling refers to generating a value in the bitstream. As noted above, video source 102 may transport the bitstream to video destination device 122 substantially in real time, or not in real time, such as might occur when storing syntax elements to storage 108 for later retrieval by the video destination device 122.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

Figure 2:
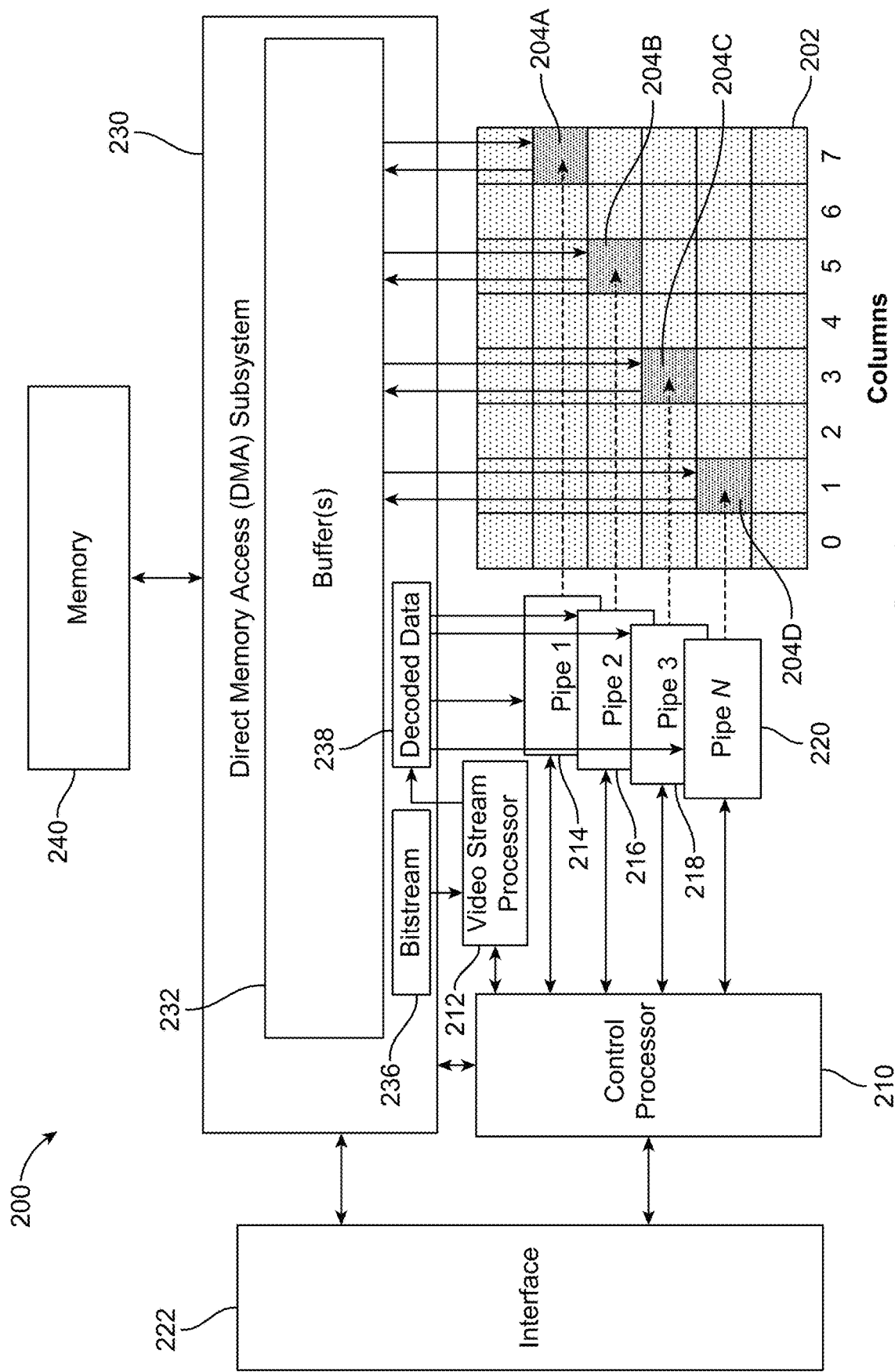
FIG. 2 is a block diagram illustrating an example architecture of a video coding hardware engine.

In some cases, the video coder hardware can include multiple subsystems and processing pipelines, some of which are shown in FIG. 2. In some examples, the processing pipelines can include various video processing operations, such as motion estimation, motion compensation, transform and quantization, etc. In some cases, the processing pipelines can perform processing operations in parallel.

FIG. 2 is a block diagram illustrating an example architecture 200 of a video coding hardware engine. In some cases, the architecture 200 can be implemented by the encoding device 104 and/or decoding device 112 shown in FIG. 1. In some examples, the architecture 200 can be implemented by the encoder engine 106 of the encoding device 104 or by the decoder engine 116 of the decoding device 112, as shown in FIG. 1.

In this example, the architecture 200 of the video coding hardware engine can include a control processor 210, an interface 222, a video stream processor (VSP) 212, processing pipelines 214-220 (also referred to as "pipes"), a direct memory access (DMA) subsystem 230, and one or more buffers 232. In some examples, the architecture 200 can include memory 240 for storing data such as frames, videos, coding information, outputs, etc. In other examples, the memory 240 can be external memory on the coding device implementing the video coding hardware engine.

The interface 222 can transfer data between components of the video coding hardware engine and/or the video coding device through a communication system or system bus on the video coding hardware engine and/or the coding device implementing the video coding hardware engine. For example, the interface 222 can connect the control processor 210, VSP 212, processing pipelines 214-220 (e.g., video pixel processor (VPP)), direct memory access (DMA) subsystem 230, and/or one or more buffers 232 with a system bus on the video coding hardware engine and/or the coding device. In some examples, the interface 222 can include a network-based communications subsystem, such as a network-on-chip (NoC).

The DMA subsystem 230 can allow other components of the video coding hardware engine (e.g., other components in the architecture 200) to access memory on the video coding hardware engine and/or the video coding device implementing the video coding hardware engine. For example, the DMA subsystem 230 can provide access to the memory 240 and/or the one or more buffers 232. In some examples, the DMA subsystem 230 can manage access to common memory units and associated data traffic (e.g., tile 202, blocks 204A-D, bitstream 236, decoded data 238, etc.).

The memory 240 can include one or more internal or external memory devices such as, for example and without limitation, one or more random access memory (RAM) components, read-only memory (ROM) components, cache memory components, buffer components, and/or other memory devices. The memory 240 can store data used by the video coding hardware engine and/or the video coding device, such as frames, processing parameters, input data, output data, and/or any other type of data.

The control processor 210 can include one or more processors. The control processor 210 can control and/or program components of the video coding hardware engine (e.g., other components in the architecture 200). In some examples, the control processor 210 can interface with other drivers, applications, and/or components that are not shown in FIG. 2. For example, in some cases, the control processor 210 can interface with an application processor on the video coding device.

The VSP 212 can perform bitstream parsing (e.g., separating a network abstraction layer, a picture layer, and a slice layer) and entropy coding operations. In some examples, the VSP 212 can perform coding functions such as variable length encoding or decoding. For example, the VSP 212 can implement a lossless compression/decompression algorithm to compress or decompress a bitstream 236. In some examples, the VSP 212 can perform arithmetic coding, such as context, adaptive binary arithmetic coding (CABAC), and/or any other coding algorithm.

The processing pipelines 214-220 can perform video pixel operations such as motion estimation, motion compensation, transform and quantization, image deblocking, and/or any other video pixel operations. In some cases, the processing pipelines 214-220 may perform video pixel operations based on output of the VSP 212. In some cases, output of one VSP 212 may be processed by multiple processing pipelines 214-220. The processing pipelines 214-220 (and/or each individual processing pipeline) can perform specific video pixel operations in parallel. For example, each processing pipeline can perform multiple operations (and/or process data) simultaneously and/or significantly in parallel. As another example, multiple processing pipelines can perform operations (and/or process data) simultaneously and/or significantly in parallel.

In FIG. 2, the processing pipelines 214-220 can store and retrieve video pixel processing data (e.g., video pixel processing outputs, inputs, parameters, pixel data, processing synchronization data, etc.) to and from the one or more buffers 232. In some cases, the one or more buffers 232 can include a single buffer. In other cases, the one or more buffers 232 can include multiple buffers. In some examples, the one or more buffers 232 can include a global input/output line buffer and a pipeline synchronization buffer. In some cases, the pipeline synchronization buffer can temporarily store data used to synchronize data and/or results from video pixel processing operations performed by the processing pipelines 214-220.

In some examples, the VSP 212 can compress a bitstream 236 associated with a video or sequence of frames, and store entropy decoded data 238 associated with the bitstream 236 for processing by the processing pipelines 214-220. In some cases, the entropy decoded data 238 may be stored in a memory or buffer and this memory or buffer may be a part of, or separate from buffer 232. In some cases, the VSP 212 can retrieve the bitstream 236 and store the entropy decoded data 238 to and from memory using the DMA subsystem 230, which can manage access to memory components and/or units as previously noted. In some cases, the VSP 212 may store the decoded data in an order based on the bitstream. For example, where the bitstream organizes image information based on tiles, the decoded data may be grouped such that decoded data for a tile is stored together, in an order that the tiles are decoded (e.g., in tile order, also referred to as bitstream order). The processing pipelines 214-220 can retrieve the entropy decoded data 238 (e.g., via the DMA subsystem 230) and perform video pixel processing operations on blocks 204A-D of a tile 202 associated with the bitstream 236.

The processing pipelines 214-220 can perform video pixel processing operations in parallel, as previously described. The processing pipelines 214-220 can retrieve and store video pixel processing inputs and outputs from/in the one or more buffers 232 (e.g., via DMA subsystem 230). For example, a motion estimation algorithm implemented by the processing pipeline 214 can perform motion estimation on block 204A and store motion estimation information calculated for block 204A in the one or more buffers 232. A motion compensation algorithm implemented by the processing pipeline 214 can retrieve the motion estimation information from the one or more buffers 232, and use the motion estimation information to perform motion compensation for block 204A. While the motion compensation algorithm is performing the motion compensation, the motion estimation algorithm can perform motion estimation for a next block.

The motion compensation algorithm can store motion compensation results in the one or more buffers 232, which can be accessed and used by transform, quantization, and deblocking algorithms to perform transform, quantization and deblocking for the block 204A. The motion compensation algorithm can perform motion compensation for a next block while the transform, quantization, and/or deblocking algorithms perform the transform, quantization and/or deblocking for the block 204A. The transform, quantization and deblocking algorithms can similarly perform respective operations for the block 204A and the next block in parallel. In some examples, the motion estimation, motion compensation, transform, quantization, and deblocking algorithms can perform respective operations on different blocks in parallel.

The processing pipelines 214-220 can be implemented by hardware and/or software components. For example, the processing pipelines 214-220 can be implemented by one or more pixel processors. In some examples, each processing pipeline can be implemented by one or more hardware components. In some cases, each processing pipeline can use different hardware units and/or components to implement different stages in a pipeline of the processing pipeline.

The number of processing pipelines shown in FIG. 2 is merely an example provided for explanation purposes. One of ordinary skill in the art will appreciate that the architecture 200 can include more or less processing pipelines than shown in FIG. 2. For example, the number of processing pipelines implemented by the architecture 200 can be increased or reduced to include more or less processing pipelines. Moreover, while the architecture 200 is shown to include certain components, one of ordinary skill will appreciate that the architecture 200 can include more or fewer components than those shown in FIG. 2. For example, the architecture 200 can also include, in some instances, other memory devices (e.g., one or more random access memory (RAM) components, read-only memory (ROM) components, cache memory components, buffer components, database components, and/or other memory devices), processing devices (e.g., one or more CPUs, GPUs, and/or other processing devices), interfaces (e.g., internal bus, etc.), and/or other components that are not shown in FIG. 2.

In some cases, a bitstream of an image to be decoded may be organized into one or more independently decodable portions, such as tiles. In some cases, the processing pipelines 214-220 can perform video pixel operations across one more parts of a tile 202 in a bitstream order and in a wave-like manner. For example, a frame may be made up of a grid of tiles, where each tile may have dimensions of h×w number of pixels. Image information for a particular tile may be packaged together in the bitstream before image information for another tile. In some cases, the frame may be decoded one tile at a time. Thus, an image may be decoded tile by tile and in a raster scan pattern within a particular tile. A raster scan pattern order may be a pattern for covering (e.g., processes, scans, etc.) a rectangular grid area that covers each cell (e.g., pixel, block, etc.) of the gird row by row from left to right and top to bottom.

In some cases, a wave-like manner may be used to decode blocks within a tile as there may be a dependency across blocks. For example, as results from processing a first block, such as block 204A, may be used to process a second block, such as block 204B on a next line (e.g., for inter-prediction, motion vector information, in-loop filtering, etc.). In some cases, a first processing pipeline 214 may perform pixel operations on a first row of a tile 202 in a certain direction, such as in a raster scan order (e.g., from left to right from columns 0 . . . 7 in tile 202) for tile 202 of the frame, while a second processing pipeline may perform pixel operations on a second row of blocks in the same direction, and so forth for any additional processing pipelines. In some cases, a processing pipeline, such as the first processing pipeline 214, may process a block on a row above and on a higher column number (e.g., to the right of when in raster scan order) than a block being processed by the next processing block, such as a second processing pipeline 216. For example, the first processing pipeline 214 may be processing a block 204A that is on a row above a block 204B that is being processed by the second processing pipeline 216. Additionally, the block 204A being processed by the first processing pipeline 214 is two columns ahead of the block 204B being processed by the second processing pipeline 216 (e.g., column 7 versus column 5). This pattern may repeat across the processing pipelines 214-220. When the first processing pipeline 214 reaches the end of the columns of tile 202, the first processing pipeline 214 may begin processing a next row of blocks (e.g., a row below the row being processed by pipeline N 220) and in the first column (e.g., column 0). In some cases, the first block, such as block 204A, may be a number of columns (e.g., two columns ahead in FIG. 2) ahead of the second block, such as block 204B, to help allow for processing time that may be used by the corresponding processing pipeline (e.g., the first processing pipeline 214).

As indicated above, the processing pipelines 214-220 may perform pixel processing operations on portions of a frame, such as for blocks of a tile and the processing pipelines 214-220 may operate in a wave-like manner. For example, each processing pipeline may start at the first column of a tile (e.g., column 0). A first processing pipeline, such as processing pipeline 214, of the processing pipelines 214-220 may start processing a block of a first row of a tile, while the other pipelines may start processing their blocks on other rows after an initial delay. In some cases, this initial delay ramping up the processing pipelines 214-220 may be incurred when beginning processing of another portion of a frame, such as for a new tile.

Figure 3:
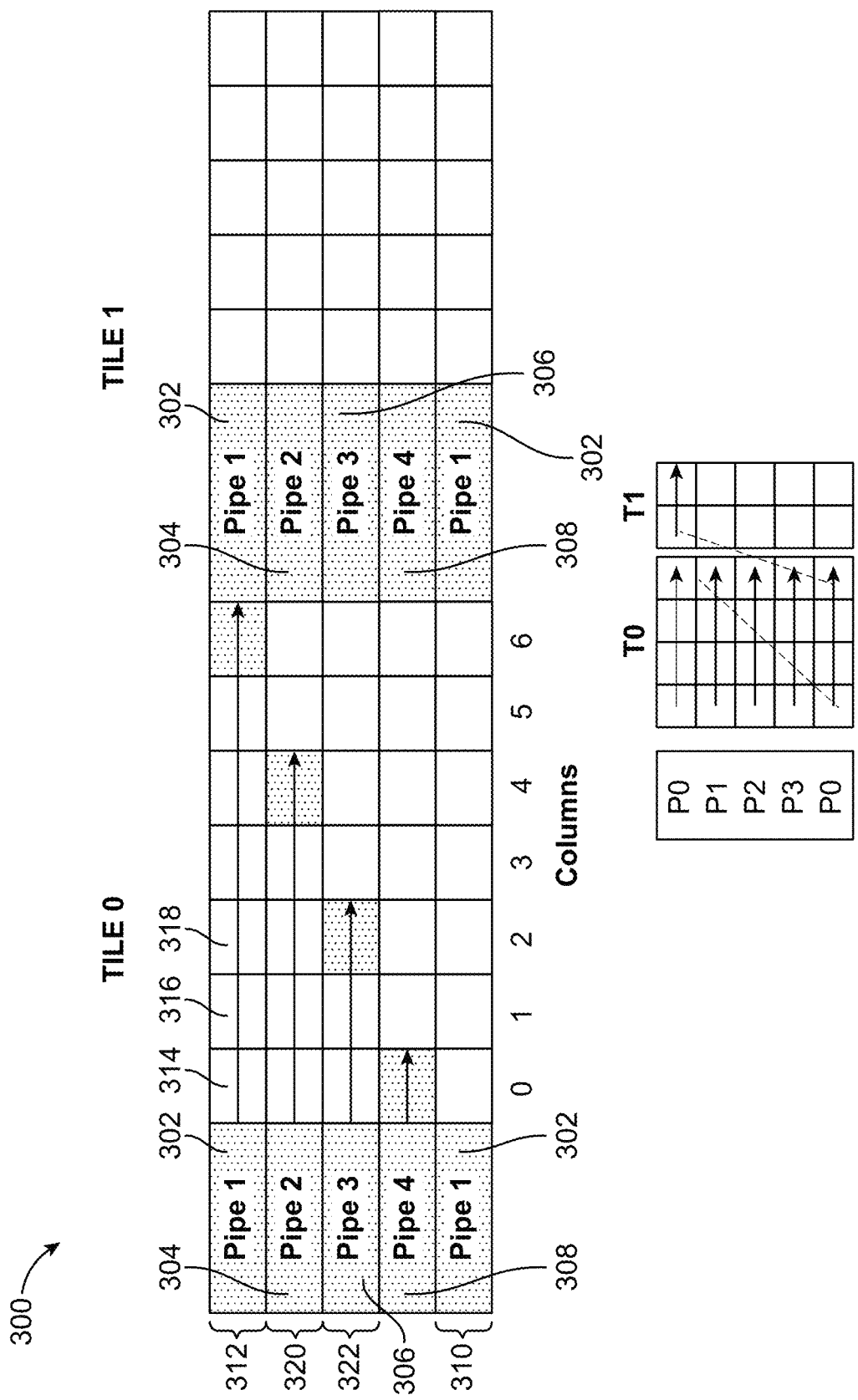
FIG. 3 is a diagram illustrating an example of multiple processing pipelines configured to process video data across multiple tiles, in accordance with aspects of the present disclosure.

FIG. 3 is a diagram 300 illustrating an example of multiple processing pipelines processing across multiple tiles, in accordance with aspects of the present disclosure. As indicated above, processing pipelines 302-308 may perform pixel processing operations on portions of a frame, such as for blocks of a tile and the processing pipelines 302-308 may operate in a wave-like manner. For example, each processing pipeline may start at the first column of a tile (e.g., column 0). Thus, a first processing pipeline, such as processing pipeline 302, of the processing pipelines 302-308, may process blocks of a tile, such as tile 0, starting at a block 314 in a first column, such as column 0, of a first row 312 of the tile. Other pipelines may start processing their blocks on other rows after an initial delay. For example, the first processing pipeline 302 may start processing tile 0 by processing block 314. Then the first processing pipeline 302 may process block 316 and block 318. When the first processing pipeline 302 begins to process block 318, a second processing pipeline 304 may begin processing a block in row 320, column 0. Similarly, when the second processing pipeline 304 begins processing a block in row 320, column 2 and the first processing pipeline 302 begins processing a block in row 312, column 4, a third processing pipeline 306 may begin processing a block in row 322, column 0. This pattern where a next processing pipeline begins after a previous processing pipeline has finished processing at least one block may be referred to as an initial delay or ramping up the processing pipelines, and this pattern may continue for each of the processing pipelines. In some cases, this initial delay ramping up the processing pipelines 214-220 may be incurred when beginning processing of another portion of a frame, such as for a new tile.

In some cases, a certain processing pipeline (such as a first processing pipeline 302) may be used to start processing each new portion of the frame (e.g., tile) and this may further increase the initial delay. For example, processing of a new tile may always start with the first processing pipeline 302. Thus, if the first processing pipeline 302 is processing a last row 310 of blocks in tile 0, second processing pipeline 304 cannot start processing a first row 312 of blocks in tile 1. Rather, there may be a delay as the first processing pipeline 302 finishes processing the last row 310 of blocks in tile 0 and begins to process the first row 312 of blocks in tile 1. The second processing pipeline 304 may then begin to process a second row 320 of blocks in tile 1, after the initial delay. Generally, the initial delay is a relatively small portion of the processing time (e.g., as a ratio of initial delay to processing time is relatively low). However, in cases where a width of a portion (e.g., tile) of the frame is relatively narrow (e.g., relatively few columns of blocks) and there are lot of portions (e.g., tiles) in the frame, then the initial delay incurred, when accumulated, may become more of an issue as the ratio of initial delay to processing time increases. To help reduce an impact of the initial delays, the video decoder may be enhanced to use tile-to-raster reordering.

Figure 4A:
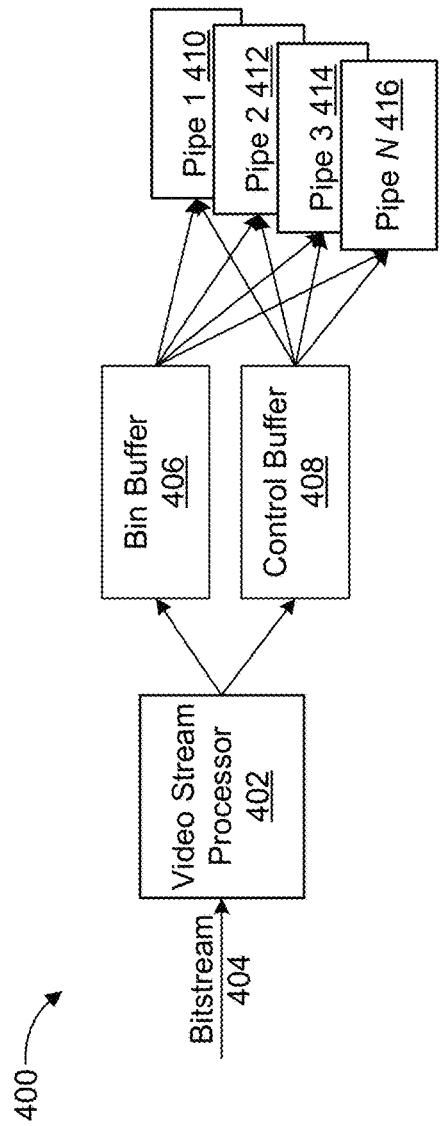
FIG. 4A is a block diagram illustrating a portion of a video coding hardware engine implementing an enhanced video decoder using tile-to-raster reordering, in accordance with aspects of the present disclosure.
Figure 4B:
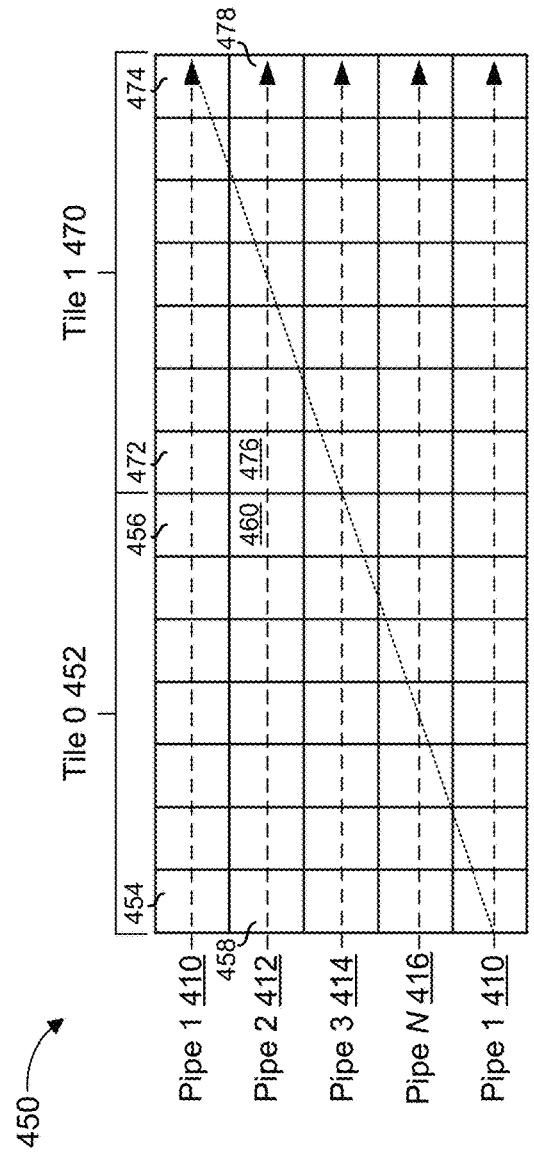
FIG. 4B is a diagram illustrating multiple processing pipelines configured to process video data across tiles, in accordance with aspects of the present disclosure.

FIG. 4A is a block diagram 400 illustrating a portion of a video coding hardware engine implementing an enhanced video decoder using tile-to-raster reordering, in accordance with aspects of the present disclosure. FIG. 4A may be discussed in conjunction with FIG. 4B, which is a diagram 450 illustrating multiple processing pipelines processing across tiles, in accordance with aspects of the present disclosure. In some cases, the portion of a video coding hardware engine may be implemented by the decoding engine 116 of the decoding device 112 as shown in FIG. 1. In diagram 400, a video stream processor (VSP) 402 may receive an encoded bitstream 404 for decoding. In some cases, bitstream 404 may be substantially similar to bitstream 236 of FIG. 2. The VSP 402 may be similar to the VSP 212 in that the VSP 402 may parse and/or partially decode (e.g., process) the encoded bitstream 404 to generate intermediate data. For example, the VSP 212 may parse the encoded bitstream 404 to extract syntax information about the blocks, such as block type, motion vectors, coefficients, parameters sets, etc., for the blocks. This intermediate data may be stored in tile order to a bin buffer 406 for further decoding and/or processing by the processing pipelines 410-416. The processing pipelines 410-416 may then process the intermediate data (e.g., perform predictions, applying the motion vector information, etc.) to generate pixels of a decoded frame. In some cases, the bin buffer 406 may be a unified buffer or memory. In some cases, the bin buffer 406 may be a part of a larger buffer or memory.

In some video coding formats, the encoded image data for a frame may be coded tile by tile in a tile order and in a raster scan order within each tile. For example, the encoded data may be partially decoded from the bitstream from block 454 to block 456 of tile 0 452 by the VSP 402. After block 456, the VSP 402 may then process block 458 to block 460 of tile 0 452. This pattern of processing the blocks of tile 0 repeats until the blocks of tile 0 452 are processed. The VSP may then begin to process tile 1 470 row by row in a similar manner as for tile 0 452, starting with block 472. In some cases, processed blocks may be written to the bin buffer 406 in substantially the same order as they are processed (e.g., in tile order).

To allow the frame to be processed in raster order for the frame and across the tiles by the processing pipelines 410-416, rather than in tile order, the VSP 402 may be enhanced to output control information indicating an order in which to further process the intermediate data to a bin buffer 406. The control information may indicate an access order for the intermediate data in the bin buffer 406 so that the intermediate data can be accessed in raster scan order for the frame (e.g., across the tiles). For example, the VSP 402 may output control information indicating that the output blocks for the first row of blocks may be processed from block 454 to 456 and then to block 472 to 474. Similarly, the control information may also indicate that the second row of blocks may be processed from block 458 to block 460 and then to block 476 to 478. The control information may be used by the processing pipelines 410-416 to perform the pixel processing operations in raster scan order for the frame. In some cases, the control information may include pointers (e.g., memory addresses) to memory locations from block to block. As a size of a block may be different from a size of another block, the VSP 402 may track memory locations for some blocks as they are written to the bin buffer 406 to generate the control information. For example, the VSP 402 may track and write, to the control buffer 408, memory addresses associated with a block at a beginning of a row, such as block 454, a block at an end of a row, such as block 456, and/or a pointer to a next row that should be processed by the processing pipelines 410-416. The control buffer 408 may be a part of a larger buffer or memory. In some cases, the control buffer 408 may be a separate portion of a larger buffer or memory that includes the bin buffer 406. In other cases, the control buffer 408 may be a buffer or memory separate from the bin buffer 406.

In some cases, load balancing across the processing pipelines 410-416 may be enhanced, such as in cases where processing of a starting row of a portion is performed by certain processing pipelines as the processing of the starting row is per frame rather than per portion. For example, based on the control information in the control buffer 408, the processing pipelines 410-416 may then process the intermediate data in the bin buffer 406 in raster scan order. For example, a first processing pipeline 410 may begin processing a first row of blocks starting at block 454 of tile 0 452 to block 456 of tile 0 450. The first processing pipeline 410 may then continue processing the first row of bocks by processing block 472 of tile 1 470 on through block 474 of tile 1 470. After a small delay (e.g., for two blocks) after the first processing pipeline 410 begins processing blocks of the first row, a second processing pipeline 412 may begin processing a second row of blocks starting at block 458 of tile 0 450 and on through block 478 of tile 1 470. Other processing pipelines of the processing pipelines 410-416 may process other rows of blocks as well. By processing the rows of a portion (e.g., tiles) in raster order for an entire frame, an amount of initial delay incurred for ramping up the processing pipelines 214-220 may be reduced from once per portion of a frame (e.g., tile) to once per frame.

Figure 5:
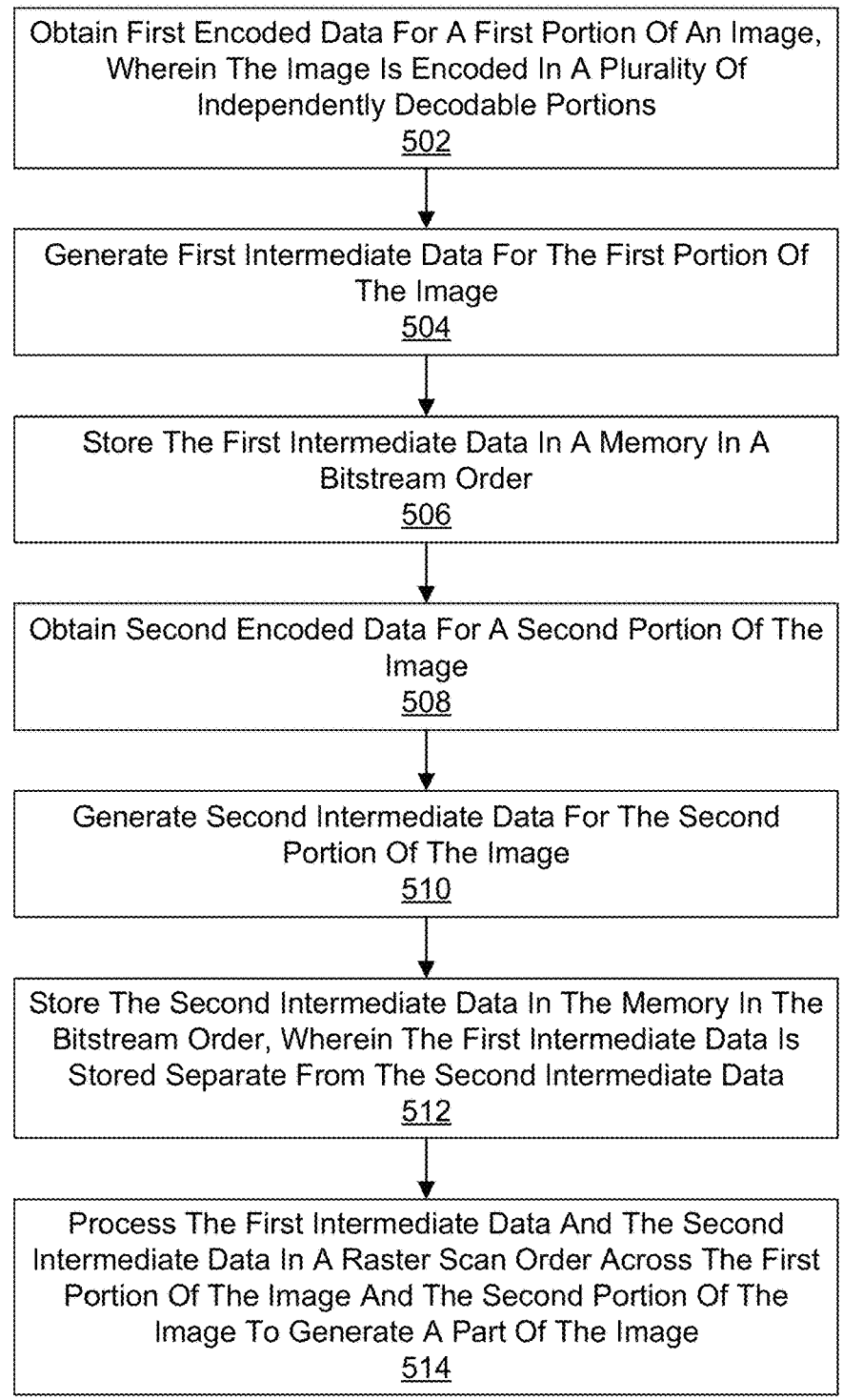
FIG. 5 is a flow diagram illustrating process for processing video data, in accordance with aspects of the present disclosure.

FIG. 5 is a flow diagram illustrating an example of a process 500 for processing video data, in accordance with aspects of the present disclosure. The process 500 may be performed by a computing device (or apparatus) or a component (e.g., example architecture 200 of a video coding hardware engine, a chipset, codec, etc.) of the computing device (e.g., decoding device 112). The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. In some cases, the computing device may be or may include coding device, such as the encoding device 104, the decoding device 112, or a combined encoding device (or codec). The operations of the process 500 may be implemented as software components that are executed and run on one or more processors.

At block 502, the computing device (or component thereof) may obtain first encoded data for a first portion of an image, wherein the image is encoded in a plurality of independently decodable portions. In some cases, a bitstream including the first encoded data and the second encoded data is encoded tile by tile and in a raster scan order per tile.

At block 504, the computing device (or component thereof) may generate first intermediate data for the first portion of the image. In some cases, the first intermediate data comprises syntax information associated with blocks of the first tile.

At block 506, the computing device (or component thereof) may store the first intermediate data in a memory in a bitstream order.

At block 508, the computing device (or component thereof) may obtain second encoded data for a second portion of the image. In some cases, the first portion of the image comprises a first tile of the image and wherein the second portion of the image comprise a second tile of the image. In some cases, the first portion of the image comprises a first plurality of rows of blocks and wherein the second portion of the image comprises a second plurality of rows of blocks.

At block 510, the computing device (or component thereof) may generate second intermediate data for the second portion of the image. In some cases, the computing device (or component thereof) may generate control data indicating the raster scan order across the first portion of the image and the second portion of the image. In some cases, the computing device (or component thereof) may store the control data. In some cases, a plurality of processing pipelines (e.g., processing pipelines 214-220, processing pipelines 302-308, and/or processing pipelines 410-416) of the computing device (or component thereof) are configured to process the first intermediate data and the second intermediate data based on the control data. In some cases, the control data comprises memory addresses for the first intermediate data and the second intermediate data At block 512, the computing device (or component thereof) may store the second intermediate data in the at least one memory in the bitstream order. In some cases, the first intermediate data is stored separate from the second intermediate data. In some cases, the first and second intermediate data and control data are stored in separate parts of the at least one memory, the control data indicating the raster scan order across the first portion of the image and the second portion of the image.

At block 514, the computing device (or component thereof) may process the first intermediate data and the second intermediate data in a raster scan order across the first portion of the image and the second portion of the image to generate a part of the image. In some cases, the computing device (or component thereof) may, to process the first intermediate data and the second intermediate data in the raster scan order, process a first row of the first portion of the image using a first processing pipeline and process a corresponding first row of the second portion of the image before the first processing pipeline begins processing a second row of the first portion of the image. In some cases, the computing device (or component thereof) may process a part of a bitstream including the first encoded data for the first portion of the image before processing a part the bitstream including the second encoded data for the second portion of the image.

The processes (or methods) described herein can be used individually or in any combination. In some implementations, the processes (or methods) described herein can be performed by a computing device or an apparatus, such as the system 100 shown in FIG. 1. For example, the processes can be performed by the encoding device 104 shown in FIG. 1 and FIG. 6, by another video source-side device or video transmission device, by the decoding device 112 shown in FIG. 1 and FIG. 7, and/or by another client-side device, such as a player device, a display, or any other client-side device. In some cases, the computing device or apparatus may include one or more input devices, one or more output devices, one or more processors, one or more microprocessors, one or more microcomputers, and/or other component(s) that is/are configured to carry out the steps of one or more processes described herein.

In some examples, the computing device may include a mobile device, a desktop computer, a server computer and/or server system, or other type of computing device. The components of the computing device (e.g., the one or more input devices, one or more output devices, one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 6:
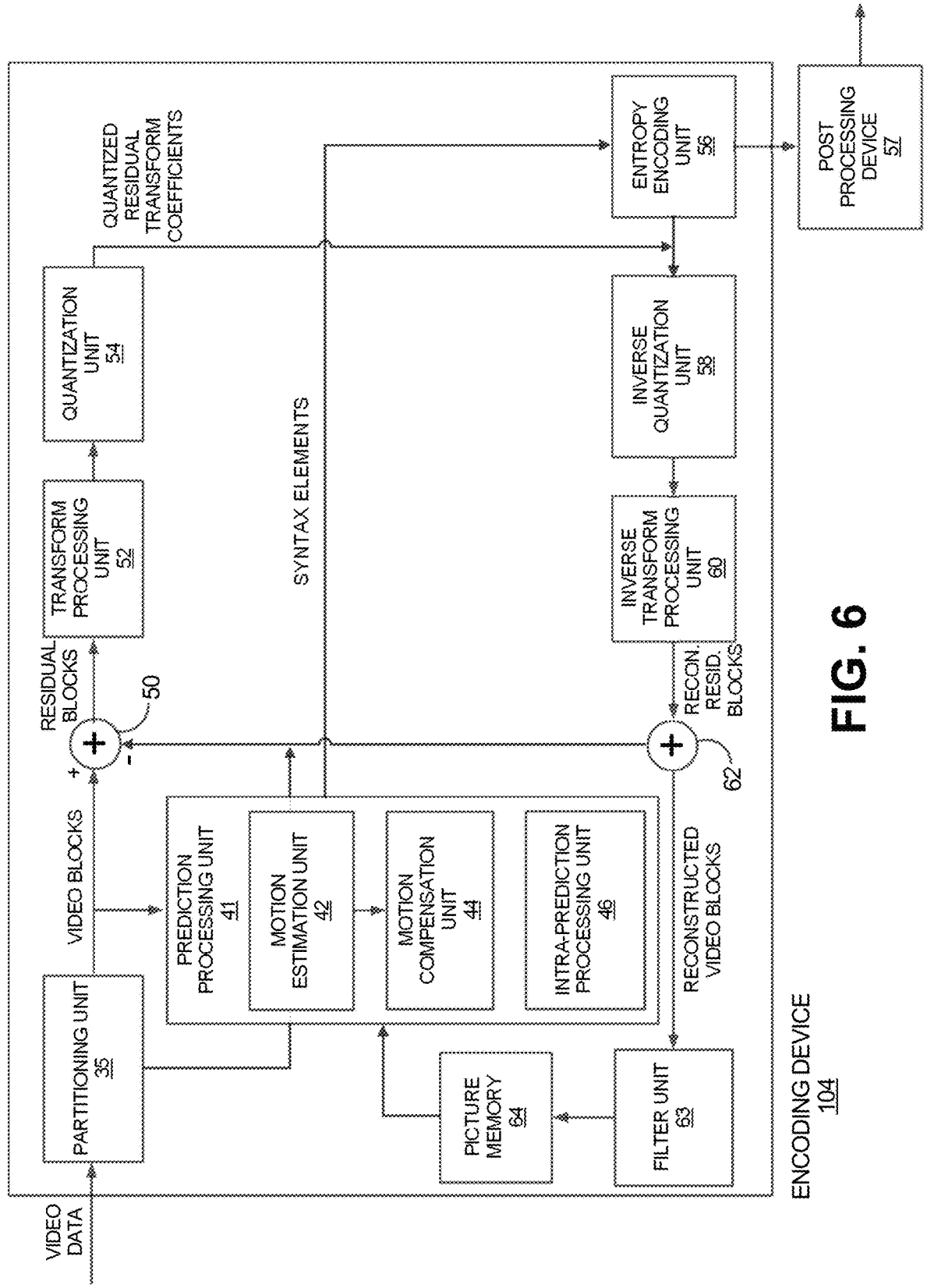
FIG. 6 is a block diagram illustrating an example video encoding device, in accordance with some aspects of the disclosure.
Figure 7:
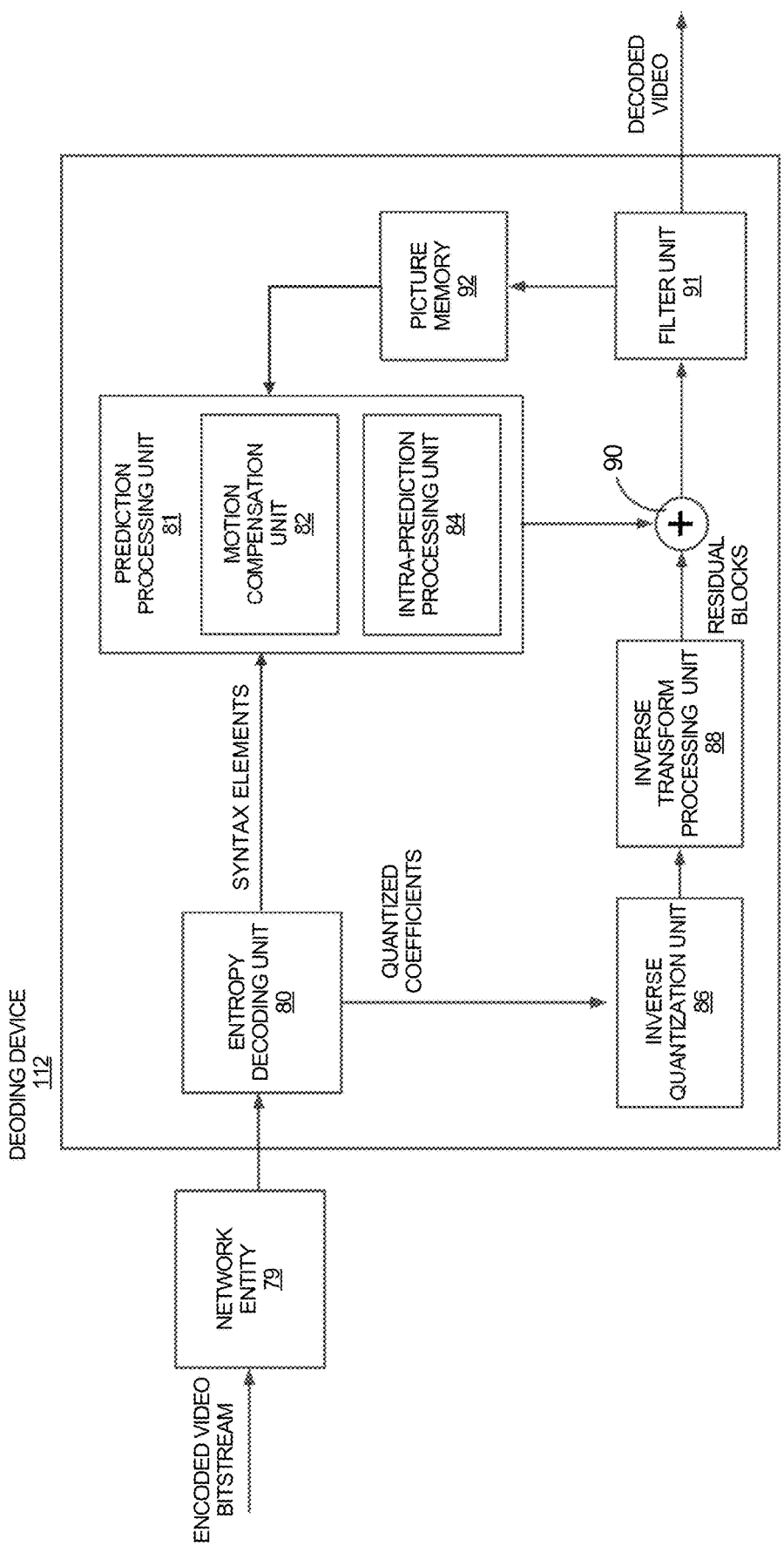
FIG. 7 is a block diagram illustrating an example video decoding device, in accordance with some aspects of the disclosure.

Specific details of the encoding device 104 and the decoding device 112 are shown in FIG. 6 and FIG. 7, respectively. FIG. 6 is a block diagram illustrating an example encoding device 104 that may implement one or more of the techniques described in this disclosure. Encoding device 104 may, for example, generate the syntax elements and/or structures described herein (e.g., the syntax elements and/or structures of a green metadata, such as Complexity Metrics (CM), or other syntax elements and/or structures). Encoding device 104 may perform intra-prediction and inter-prediction coding of video blocks within video slices, tiles, sub-pictures, etc. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 6 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 6, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by merging (e.g., adding, summing) the residual block to a predictive block of one of the reference pictures within a reference picture list. Motion compensation unit 44 may also apply one or more interpolation filters to the reconstructed residual block to calculate sub-integer pixel values for use in motion estimation. Summer 62 merges the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 6 represents an example of a video encoder configured to perform any of the techniques described herein. In some cases, some of the techniques of this disclosure may also be implemented by post processing device 57.

FIG. 7 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 6.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 7 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 7 represents an example of a video decoder configured to perform any of the techniques described herein.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for processing video data, comprising: at least one memory; at least one processor coupled to the at least one memory, the at least one processor being configured to: obtain first encoded data for a first portion of an image, wherein the image is encoded in a plurality of independently decodable portions; generate first intermediate data for the first portion of the image; store the first intermediate data in the at least one memory in a bitstream order; obtain second encoded data for a second portion of the image; generate second intermediate data for the second portion of the image; and store the second intermediate data in the at least one memory in the bitstream order, wherein the first intermediate data is stored separate from the second intermediate data; and a plurality of processing pipelines coupled to the at least one processor and the at least one memory, the plurality of processing pipelines configured to process the first intermediate data and the second intermediate data in a raster scan order across the first portion of the image and the second portion of the image to generate a part of the image.

Aspect 2. The apparatus of Aspect 1, wherein: the at least one processor is further configured to: generate control data indicating the raster scan order across the first portion of the image and the second portion of the image; and store the control data; and the plurality of processing pipelines are configured to process the first intermediate data and the second intermediate data based on the control data.

Aspect 3. The apparatus of any of Aspects 1-2, wherein a bitstream including the first encoded data and the second encoded data is encoded tile by tile and in a raster scan order per tile.

Aspect 4. The apparatus of Aspect 3, wherein the first portion of the image comprises a first tile of the image and wherein the second portion of the image comprise a second tile of the image.

Aspect 5. The apparatus of Aspect 4, wherein the first intermediate data comprises syntax information associated with blocks of the first tile.

Aspect 6. The apparatus of any of Aspects 1-5, wherein the first and second intermediate data and control data are stored in separate parts of the at least one memory, the control data indicating the raster scan order across the first portion of the image and the second portion of the image.

Aspect 7. The apparatus of Aspect 6, wherein the control data comprises memory addresses for the first intermediate data and the second intermediate data.

Aspect 8. The apparatus of any of Aspects 1-7, wherein the first portion of the image comprises a first plurality of rows of blocks and wherein the second portion of the image comprises a second plurality of rows of blocks.

Aspect 9. The apparatus of any of Aspects 1-8, wherein, to process the first intermediate data and the second intermediate data in the raster scan order, a first processing pipeline, of the plurality of processing pipelines, is configured to process a first row of the first portion of the image and a corresponding first row of the second portion of the image before the first processing pipeline begins processing a second row of the first portion of the image.

Aspect 10. The apparatus of any of Aspects 1-9, wherein the at least one processor is further configured to process a part of a bitstream including the first encoded data for the first portion of the image before processing a part the bitstream including the second encoded data for the second portion of the image.

Aspect 11. The apparatus of any of Aspects 1-10, wherein the apparatus comprises a decoder.

Aspect 12. The apparatus of any of Aspects 1-11, further comprising a display configured to display the generated part of the image.

Aspect 13. The apparatus of any of Aspects 1-12, wherein the apparatus is a mobile device.

Aspect 14. A method for processing video, comprising: obtaining first encoded data for a first portion of an image, wherein the image is encoded in a plurality of independently decodable portions; generating first intermediate data for the first portion of the image; storing the first intermediate data in at least one memory in a bitstream order; obtaining second encoded data for a second portion of the image; generating second intermediate data for the second portion of the image; storing the second intermediate data in the at least one memory in the bitstream order, wherein the first intermediate data is stored separate from the second intermediate data; and processing the first intermediate data and the second intermediate data in a raster scan order across the first portion of the image and the second portion of the image to generate a part of the image.

Aspect 15. The method of Aspect 14, further comprising: generating control data indicating the raster scan order across the first portion of the image and the second portion of the image; storing the control data; and processing the first intermediate data and the second intermediate data based on the control data.

Aspect 16. The method of any of Aspects 14-15, wherein a bitstream including the first encoded data and the second encoded data is encoded tile by tile and in a raster scan order per tile.

Aspect 17. The method of Aspect 16, wherein the first portion of the image comprises a first tile of the image and wherein the second portion of the image comprise a second tile of the image.

Aspect 18. The method of Aspect 17, wherein the first intermediate data comprises syntax information associated with blocks of the first tile.

Aspect 19. The method of any of Aspects 14-18, wherein the first and second intermediate data and control data are stored in separate parts of the at least one memory, the control data indicating the raster scan order across the first portion of the image and the second portion of the image.

Aspect 20. The method of Aspect 19, wherein the control data comprises memory addresses for the first intermediate data and the second intermediate data.

Aspect 21. The method of any of Aspects 14-20, wherein the first portion of the image comprises a first plurality of rows of blocks and wherein the second portion of the image comprises a second plurality of rows of blocks.

Aspect 22. The method of any of Aspects 14-21, wherein processing the first intermediate data and the second intermediate data in the raster scan order comprises: processing a first row of the first portion of the image in a first processing pipeline; and processing a corresponding first row of the second portion of the image before the first processing pipeline begins processing a second row of the first portion of the image.

Aspect 23. The method of any of Aspects 14-22, further comprising processing a part of a bitstream including the first encoded data for the first portion of the image before processing a part the bitstream including the second encoded data for the second portion of the image.

Aspect 24. A non-transitory computer-readable medium having stored thereon instructions that, when executed by at least one processor, cause the at least one processor to: obtain first encoded data for a first portion of an image, wherein the image is encoded in a plurality of independently decodable portions; generate first intermediate data for the first portion of the image; store the first intermediate data in at least one memory in a bitstream order; obtain second encoded data for a second portion of the image; generate second intermediate data for the second portion of the image; and store the second intermediate data in the at least one memory in the bitstream order, wherein the first intermediate data is stored separate from the second intermediate data; and wherein the instructions, when executed by a plurality of processing pipelines, further cause the plurality of processing pipelines to process the first intermediate data and the second intermediate data in a raster scan order across the first portion of the image and the second portion of the image to generate a part of the image.

Aspect 25. The non-transitory computer-readable medium of Aspect 24, wherein a bitstream including the first encoded data and the second encoded data is encoded tile by tile and in a raster scan order per tile.

Aspect 26. The non-transitory computer-readable medium of Aspect 25, wherein the first portion of the image comprises a first tile of the image and wherein the second portion of the image comprise a second tile of the image.

Aspect 27. The non-transitory computer-readable medium of Aspect 26, wherein the first intermediate data comprises syntax information associated with blocks of the first tile.

Aspect 28. The non-transitory computer-readable medium of any of Aspects 24-27, wherein the first and second intermediate data and control data are stored in separate parts of the at least one memory, the control data indicating the raster scan order across the first portion of the image and the second portion of the image.

Aspect 29. The non-transitory computer-readable medium of Aspect 28, wherein the control data comprises memory addresses for the first intermediate data and the second intermediate data.

Aspect 30. The non-transitory computer-readable medium of any of Aspects 24-29, wherein the first portion of the image comprises a first plurality of rows of blocks and wherein the second portion of the image comprises a second plurality of rows of blocks.

Aspect 31. The non-transitory computer-readable medium of any of Aspects 24-30, wherein, to process the first intermediate data and the second intermediate data in the raster scan order, the instructions cause a first processing pipeline, of the plurality of processing pipelines, to process a first row of the first portion of the image and a corresponding first row of the second portion of the image before the first processing pipeline begins processing a second row of the first portion of the image.

Aspect 32. The non-transitory computer-readable medium of any of Aspects 24-31, wherein the instructions further cause the at least one processor to process a part of a bitstream including the first encoded data for the first portion of the image before processing a part the bitstream including the second encoded data for the second portion of the image.

Aspect 33. An apparatus for processing video data, comprising one or more means for performing operations according to Aspects 1 to 32, or any combination thereof.

What is claimed is:

1. An apparatus for processing video data, comprising:
   at least one memory;
   at least one processor coupled to the at least one memory, the at least one processor being configured to:
      obtain first encoded data for a first portion of an image, wherein the image is encoded in a plurality of independently decodable portions;
      generate first intermediate data for the first portion of the image, wherein the first intermediate data includes first syntax information that is separate from the first encoded data;
      store the first intermediate data in the at least one memory in a bitstream order;
      obtain second encoded data for a second portion of the image;
      generate second intermediate data for the second portion of the image, wherein the second intermediate data includes second syntax information that is separate from the second encoded data;
      store the second intermediate data in the at least one memory in the bitstream order, wherein the first intermediate data is stored separate from the second intermediate data;
      generate control data indicating an access order for accessing the first intermediate data and the second intermediate data from the at least one memory in a raster scan order across the first portion of the image and the second portion of the image; and
      store the control data in the at least one memory; and
   a plurality of processing pipelines coupled to the at least one processor and the at least one memory, the plurality of processing pipelines configured to process, based on the control data, the first encoded data using the first intermediate data and to process the second encoded data using the second intermediate data in the raster scan order across the first portion of the image and the second portion of the image to generate a part of the image.

2. The apparatus of claim 1, wherein a bitstream including the first encoded data and the second encoded data is encoded tile by tile and in a raster scan order per tile.

3. The apparatus of claim 2, wherein the first portion of the image comprises a first tile of the image and wherein the second portion of the image comprise a second tile of the image.

4. The apparatus of claim 3, wherein the first syntax information of the first intermediate data comprises syntax information associated with blocks of the first tile, and wherein the second syntax information of the second intermediate data comprises syntax information associated with blocks of the second tile.

5. The apparatus of claim 1, wherein the first and second intermediate data and the control data are stored in separate parts of the at least one memory.

6. The apparatus of claim 1, wherein the control data comprises memory addresses for the first intermediate data and the second intermediate data.

7. The apparatus of claim 1, wherein the first portion of the image comprises a first plurality of rows of blocks and wherein the second portion of the image comprises a second plurality of rows of blocks.

8. The apparatus of claim 1, wherein, to process the first intermediate data and the second intermediate data in the raster scan order, a first processing pipeline, of the plurality of processing pipelines, is configured to process a first row of the first portion of the image and a corresponding first row of the second portion of the image before the first processing pipeline begins processing a second row of the first portion of the image.

9. The apparatus of claim 1, wherein the at least one processor is configured to process a part of a bitstream including the first encoded data for the first portion of the image before processing a part the bitstream including the second encoded data for the second portion of the image.

10. The apparatus of claim 1, wherein the apparatus comprises a decoder.

11. The apparatus of claim 1, further comprising a display configured to display the generated part of the image.

12. The apparatus of claim 1, wherein the apparatus is a mobile device.

13. The apparatus of claim 2, wherein the bitstream order is a tile order.

14. A method for processing video, comprising:
   obtaining first encoded data for a first portion of an image, wherein the image is encoded in a plurality of independently decodable portions;
   generating first intermediate data for the first portion of the image, wherein the first intermediate data includes first syntax information that is separate from the first encoded data;
   storing the first intermediate data in at least one memory in a bitstream order;
   obtaining second encoded data for a second portion of the image;
   generating second intermediate data for the second portion of the image, wherein the second intermediate data includes second syntax information that is separate from the second encoded data;
   storing the second intermediate data in the at least one memory in the bitstream order, wherein the first intermediate data is stored separate from the second intermediate data;

generating control data indicating an access order for accessing the first intermediate data and the second intermediate data from the at least one memory in a raster scan order across the first portion of the image and the second portion of the image;

storing the control data in the at least one memory; and processing, based on the control data, the first encoded data using the first intermediate data and the second encoded data using the second intermediate data in the raster scan order across the first portion of the image and the second portion of the image to generate a part of the image.

15. The method of claim 14, wherein a bitstream including the first encoded data and the second encoded data is encoded tile by tile and in a raster scan order per tile.

16. The method of claim 15, wherein the first portion of the image comprises a first tile of the image and wherein the second portion of the image comprise a second tile of the image.

17. The method of claim 16, wherein the first syntax information of the first intermediate data comprises syntax information associated with blocks of the first tile, and wherein the second syntax information of the second intermediate data comprises syntax information associated with blocks of the second tile.

18. The method of claim 14, wherein the first and second intermediate data and control data are stored in separate parts of the at least one memory.

19. The method of claim 14, wherein the control data comprises memory addresses for the first intermediate data and the second intermediate data.

20. The method of claim 14, wherein the first portion of the image comprises a first plurality of rows of blocks and wherein the second portion of the image comprises a second plurality of rows of blocks.

21. The method of claim 14, wherein processing the first intermediate data and the second intermediate data in the raster scan order comprises:

processing a first row of the first portion of the image in a first processing pipeline; and processing a corresponding first row of the second portion of the image before the first processing pipeline begins processing a second row of the first portion of the image.

22. The method of claim 14, further comprising processing a part of a bitstream including the first encoded data for the first portion of the image before processing a part the bitstream including the second encoded data for the second portion of the image.

23. The method of claim 15, wherein the bitstream order is a tile order.

* * * * *